One United States Patent Office 2,716,555
Patented Aug. 30, 1955

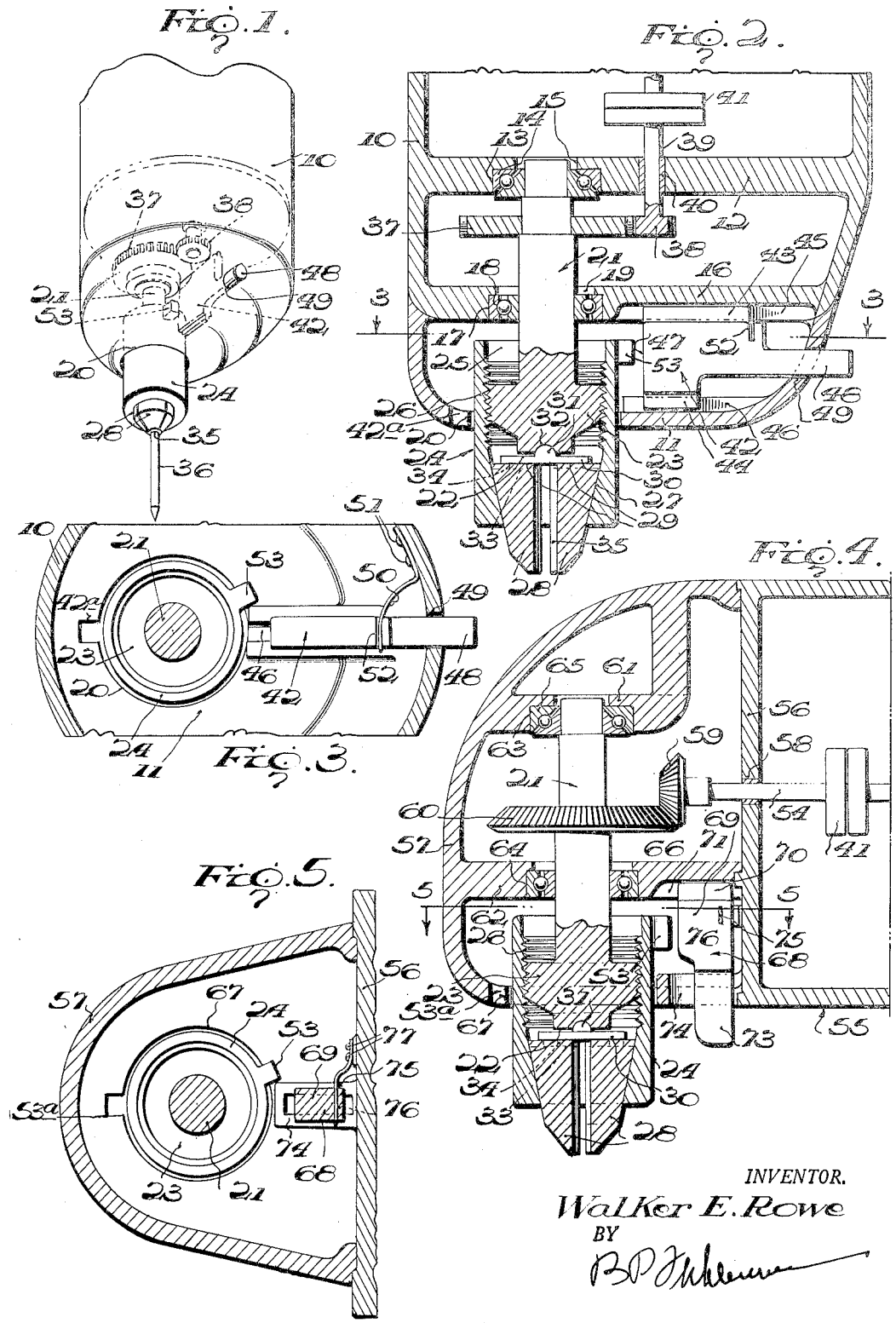

2,716,555

POWER OPERATED CHUCK DEVICE

Walker E. Rowe, Georgetown, S. C.

Application August 19, 1953, Serial No. 375,263

5 Claims. (Cl. 279—56)

My invention relates to a power operated chuck for portable electric drills, drill presses and the like.

A primary object of the invention is to provide a chuck of the above mentioned character, including means whereby the jaws of the chuck may be opened and closed without the aid of a wrench, or like hand tool.

A further object is to provide a chuck device which utilizes the rotational power of the drill spindle to actuate the jaws of the chuck, during opening and closing of the same.

A further object is to provide a power operated chuck of the above mentioned character which is simplified in construction, compact, safe, and reliable and efficient in operation.

Other objects and advantages of the invention will be apparent during the course of the following description.

In the accompanying drawings, forming a part of this application, and in which like numerals are employed to designate like parts throughout the same, Figure 1 is a fragmentary perspective view of a portable drill embodying a power operated chuck, which is the subject of the invention, Figure 2 is an enlarged central vertical secton through the same, Figure 3 is a fragmentary horizontal section taken on line 3—3 of Figure 2, Figure 4 is a fragmentary central vertical section through a portable drill and chuck embodying a modification of the invention, and, Figure 5 is a horizontal cross section taken on line 5—5 of Figure 4.

In the drawings, where for the purpose of illustration are shown preferred embodiments of my invention, attention is directed first to Figures 1 to 3 inclusive, wherein the numeral 10 designates generally the casing of a portable electric drill, or the like. The casing 10 is provided near and inwardly of its forward end 11 with a first internal web or support plate 12, preferably integral therewith. This web 12 is provided in its forward face with a recess 13, receiving a ball bearing 14, as shown. A somewhat reduced opening 15 leads from the bottom of the recess 13 through the rear side of the web 12.

A second internal web or support plate 16 is formed within the casing 10, substantially midway between the web 12 and the forward end 11. The web 16 is provided in its forward face with a recess 17, receiving a second ball bearing 18. A reduced opening 19 leads from the bottom of the recess 17 through the rear face of the web 16, Figure 2. The casing 10 is provided in its forward end 11 with a suitable clearance opening 20 for my chuck to be described, and the opening 20 is in axial alignment with the openings 15 and 19.

A shaft or spindle 21 is supported within the inner races of the ball bearings 14 and 18 for free rotation, and this spindle extends forwardly of the web 16, as shown, and has its forward end 22 terminating slightly forwardly of the casing end 11. An enlarged screw threaded head 23 is formed upon the spindle 21, just rearwardly of its forward end 22, in the region of the opening 20.

A tubular jaw actuating member or sleeve 24 is provided, and arranged for rotation with the spindle 21, within the opening 20, the sleeve extending forwardly and rearwardly of the casing end 11, as shown. The sleeve 24 has a large cylindrical bore 25 opening through its rear end, and screw threaded throughout a major portion of the length of the sleeve, as indicated at 26, for engagement with the screw threaded head 23. Forwardly of the screw threads 26, the bore of the sleeve 24 is conically tapered toward the forward end of the sleeve, as shown at 27, and this conically tapered bore portion opens through the forward end of the sleeve 24.

A plurality of segmental chuck jaws or sections 28, having conically tapered outer faces are disposed within the tapered bore portion 27, and project axially forwardly of the sleeve 24, as shown. The jaws 28 have inner flat ends 29, slidably engaging a flat thrust plate or disc 30, arranged within the bore of the sleeve 24, and provided upon its rear face with a spherically curved lug or bearing part 31, integral therewith, having swiveled engagement within a spherically curved recess 32 in the forward end 22 of the spindle 21. The jaws 28 are slidable radially, inwardly and outwardly upon the forward face of the disc 30, as controlled by the jaw actuating sleeve 24, in a manner to be described. Each jaw 28 is preferably provided in its rear end 29 with a radial groove or keyway 33, slidably receiving a lug or key 34, formed upon the forward face of the disc 30, and this provides means for guiding the jaws during their radial movement. The keyways 33 and keys 34 may be omitted entirely, if desired.

The chuck jaws 28 are provided in their inner faces with the usual cylindrical recesses for receiving the drill or bit 36, Figure 1.

A relatively large gear 37 is rigidly secured to the spindle 21, near and forwardly of the ball bearing 14, and this gear meshes with a relatively small gear 38, rigidly secured to a shaft 39, extending rotatably through a bushing 40 within the web 12. The shaft 39 is parallel with the spindle 21, and extends axially rearwardly within the casing 10 as shown. A friction clutch device 41 is preferably connected in the shaft 39, rearwardly of the web 12, and forwardly of its point of connection with the armature shaft of an electric motor, not shown, within the casing 10, rearwardly of the web 12. The clutch device 41 is of convential construction, and will slip to allow relative rotation between the sections of the shaft 39, forwardly and rearwardly of the clutch device, when greater than a pre-determined torque is transmitted through the gear 38. The clutch device 41 may be omitted, if desired.

A radially shiftable locking plate or slide 42 is disposed within the forward portion of the casing 10, between the foreward end 11 and web 16. This slide 42 is provided upon its upper and lower sides, Figure 2, with reduced extensions or ribs 43 and 44 slidable within grooves 45 and 46, formed in the opposed faces of the web 16 and casing end 11, respectively. The inner end 47 of the slide 42 is straight, and parallel with the spindle 21 and sleeve 24, and the plate or slide 42 is disposed in a plane through the axial center of the spindle 21. The slide 42 has an outer reduced operating extension or button 48, integral therewith, extending through a clearance opening 49 in the adjacent side of the casing 10. The extension 48 projects outwardly of the sidewall of the casing 10, near and rearwardly of its forward end 11, as indicated. The slide 42 is radially shiftable toward and from the spindle 21 and sleeve 24, and is guided during movement by the radial grooves 45 and 46.

A leaf spring 50 has one end rigidly secured at 51 to the inner face of the sidewall of casing 10, and the free end of this leaf spring is disposed within a transverse opening or slot 52, formed within the slide 42, adjacent to the inner end of the extension 48 and at the outer end of the rib 43, Figure 2. The spring 50 is tensioned to normally bias the slide 42 outwardly or away from contact with the sleeve 24, in the position shown in Figures 2 and 3.

A radial stop extension or lug 53 is integrally formed upon the periphery of the sleeve 24, near its rear end, for engagement with the slide 42, when the slide is shifted radially inwardly by pressure upon the button 48.

A notch 42a is provided in the end wall 11, to permit the passage of the lug 53 into and from the casing 10, when the device is being assembled and disassembled. This notch 42a opens into the clearance opening 20, as shown.

In operation, rotation is imparted to the spindle 21, from the motor, not shown, by means of the shaft 39 and gearing. The sleeve 24 and the jaws 28 carried thereby rotate with the spindle 21, due to the screw threaded connection between the spindle and sleeve 24.

When it is desired to secure the drill bit 36 within the jaws 28, the same may be introduced loosely between the jaws prior to starting the electric motor. The operator then presses the button 48 inwardly, for shifting the slide 42 toward the periphery of the sleeve 24. The inner end of the slide 42 now engages the stop lug 53 of the sleeve 24, and positively locks the sleeve against further rotation with the spindle 21. The sleeve 24 is now immediately drawn axially inwardly or rearwardly upon the rotating spindle 21, due to its screw threaded engagement therewith, and the tapered bore portion 27 forces the segmental jaws 28 radially inwardly into tight gripping engagement with the drill bit. The button 48 is now released, and the spring 50 shifts the slide 42 radially outwardly to its normal position, wherein the slide is out of engagement with the lug 53. When this occurs, the sleeve 24 is again free to rotate with the spindle 21, so that the desired drilling operation may be accomplished.

When it is desired to loosen the engagement of the jaws 28 with the drill bit, the electric motor is stopped, and the button 48 is again pushed inwardly. The motor is now started in the reverse direction, and the stop lug 53 will engage the opposite side of the slide 42. This action locks the sleeve 24 against rotation, and as the spindle 21 continues to rotate, the sleeve 24 shifts forwardly upon the spindle and the tapered bore portion 27 moves forwardly upon the jaws 28 and allows them to shift radially outwardly sufficiently to loosen the drill bit. The button 48 is now released, and the drill bit 36 will drop easily from the chuck.

During the above described tightening and loosening operations upon the jaws 28, the clutch device 41, if employed, may slip when the stop lug 53 strikes the slide 42, to prevent too much strain from being placed upon the mechanism, but this will not interfere with the tightening and loosening of the jaws upon the drill bit. I have found that the slipping clutch may be omitted from small portable drills, having fractional horse power motors which are not capable of developing excessive torque, and during the tightening and loosening operations, the electric motor will simply be brought to a momentary halt, without damaging the same or any other part of the device.

In Figures 4 and 5, I have shown a modification of the invention, wherein a drive shaft 54, corresponding to the shaft 39 is arranged at right angles to the spindle 21, rather than parallel thereto, as in the first form of the invention. The same friction clutch device 41 employed in the first form of the invention may be connected in the drive shaft 54, forwardly of its connection with the electric motor, not shown, which is housed within a casing 55, rearwardly of the clutch device 41. A web or plate 56, formed near and rearwardly of the forward end 57 of the casing contains a bushing 58, within which the shaft 54 is journaled for rotation.

A relatively small bevel gear 59 is rigidly secured to the forward end of the shaft 54, and meshes with a relatively large bevel gear 60, rigidly secured to the spindle 21, for rotation therewith. Webs or walls 61 and 62 are secured within the forward portion of the casing 55, in parallel spaced relation, at right angles to the web 56. These walls 61 and 62 have recesses 63 and 64, respectively, formed therein for receiving ball bearings 65 and 66. The ball bearings support the spindle 21 for free rotation, with the bevel gear 60 arranged between them. The spindle 21 extends below the wall 62 and has its lower end 22 spaced slightly below the bottom wall of the casing 55, which is provided with a clearance opening 67 for the jaw actuating sleeve 24. The jaws 28, head 23, disc 30, stop lug 53, sleeve 24 and associated elements of the chuck are identical with the corresponding elements shown and described in connection with the first form of the invention.

A modified form of locking trigger or slide 68 is provided, and serves the same purpose as the slide 42. The trigger or slide 68 has a central body portion 69, shiftable toward and from the sleeve 24, for engagement with the stop lug 53. The trigger 68 has a top reduced extension or rib 70, integral therewith, slidable within a groove 71 within the bottom of the wall 62. A depending reduced operating extension 73 of the trigger 68 operates within a guide slot 74 formed within the bottom wall of the casing 55, between the web 56 and opening 67. A leaf spring 75 extends through a slot 76 formed within the trigger 68 near its top, and has one end anchored at 77 to the web 56 of the motor casing.

A notch 53a in the bottom wall of casing 55 opens into the clearance opening 67, and serves to allow the passage of the lug 53 into and out of the casing 55, during assembly and disassembly of the device.

In operation, the second form of the invention, Figures 4 and 5, is substantially identical with the first form. Rotation is imparted to the spindle 21 and sleeve 24 by the drive shaft 54, and gearing. The trigger 68 is manually shifted into and out of engagement with the stop lug 53, to effect tightening and loosening of the jaws 28 upon the drill bit. The spring 75 serves to hold the trigger normally in the outermost position, Figure 4, free of engagement with the stop lug 53. The operating extension 73 in this form of the invention is nearer the sleeve 24 than the extension or button 48 in the first form of the invention. No further description of the operation of the device is thought to be necessary.

Although I have shown and described my power operated chuck in connection with portable type electric drills, I wish to point out that the chuck may be employed effectively upon machine shop type drill presses, and the like.

It is to be understood that the forms of the invention, herewith shown and described, are to be taken as preferred examples of the same, and that various changes in the shape, size and arrangement of parts may be resorted to, without departing from the spirit of the invention or the scope of the subjoined claims.

Having thus described my invention, I claim:

1. In a device of the character described, a support, a spindle journaled upon the support for rotation and having a screw threaded part, a sleeve having screw threaded engagement with said screw threaded part of the spindle and rotatable therewith and shiftable axially of the spindle when held against rotation, said sleeve including a part having a tapering bore, tapering jaw sections contained within the tapering bore part of the sleeve and shiftable radially inwardly and outwardly when the sleeve moves axially of the spindle, a single radial stop element only carried by the sleeve and projecting radially thereof, a reciprocatory element connected with said support and shiftable radially into and out of engagement with the single stop element of the sleeve and coacting therewith to lock the sleeve against rotation with the spindle, and means for turning the spindle in opposite directions.

2. A power operated chuck device comprising a support, a spindle journaled upon the support for rotation and having a screw threaded portion and a forward end near said screw threaded portion, means connected with the spindle for rotating the same in opposite directions, a sleeve surrounding the screw threaded portion and end of the spindle and having screw threaded engagement with the portion and bodily carried by the spindle, the sleeve having a conically tapered bore forwardly of said end of the spindle opening through the forward end of the sleeve, chuck jaws disposed within the conically tapered bore of the sleeve and having conically tapered surfaces engaging the bore, an element disposed between the forward end of the spindle and the rear ends of said jaws and slidably engaging the rear ends of the jaws, means upon said sleeve forming a stop to prevent rotation of the sleeve with the spindle, and a manually operated radially reciprocatory element movably mounted upon the support and shiftable into and out of engagement with said means and adapted to cooperate with the means for locking the sleeve against rotation with the spindle, whereby continued rotation of the spindle causes the sleeve to move axially upon the spindle for shifting the jaws radially thereof.

3. A power operated chuck device comprising a support, a spindle journaled upon the support for rotation and having a screw threaded part, gearing connected with the spindle to rotate the same, a sleeve having a screw threaded bore portion receiving the screw threaded part of the spindle and a tapered bore portion forwardly of the screw threaded bore portion and opening through the forward end of the sleeve, jaw segments mounted within the tapered bore portion of the sleeve and held thereby within the sleeve forwardly of said spindle and adapted to receive and hold a drill bit or the like, means slidably contacting the rear ends of the jaw segments and preventing rearward movement of the same relative to the spindle but permitting the jaw segments to move radially inwardly and outwardly upon longitudinal movement of the sleeve, a short radial stop element carried by the sleeve, and a member slidably mounted upon the support for reciprocation radially of the sleeve and spindle and adapted to engage the stop element for locking the sleeve against rotation with the spindle and thereby effecting longitudinal movement of the sleeve relative to the spindle.

4. A device of the character described comprising a support, a spindle journaled upon the support for rotation and having a screw threaded part, a jaw actuating member carried by the spindle and having a screw threaded part engaging the screw threaded part of the spindle and a radial stop lug, jaws connected with said member and adapted to be shifted radially by the member when the member moves longitudinally of the spindle, a reciprocatory element shiftable radially into and out of engagement with the radial stop lug of the member and adapted to lock the member against rotation with the spindle, resilient means engaging the element to hold the same out of engagement with the member, a drive shaft journaled upon the support and extending longitudinally of the spindle, a first gear carried by the spindle, and a second gear secured to the drive shaft and meshing with the first gear.

5. A device of the character described comprising a casing a spindle journaled upon the casing for rotation and having a screw threaded part, a jaw actuating member carried by the spindle and having a screw threaded part engaging the screw threaded part of the spindle, a short radial stop lug secured to the member for rotation therewith, jaws connected with said member and adapted to be shifted radially inwardly thereby when the member moves longitudinally upon the spindle in one direction, a radially reciprocatory element mounted upon the casing for movement into and out of engagement with the stop lug of the member and adapted to lock the member against rotation with the spindle, a leaf spring connected with said element to normally hold the same out of engagement with the stop lug, a drive shaft journaled upon the casing substantially at right angles to the spindle, a first bevel gear secured to the drive shaft, and a second bevel gear secured to the spindle and engaging the first bevel gear and driven thereby.

References Cited in the file of this patent

UNITED STATES PATENTS

| | | |
|---|---|---|
| 374,594 | Goodell | Dec. 13, 1887 |
| 626,474 | Ames | June 6, 1889 |
| 1,470,197 | Ryther | Oct. 9, 1923 |